United States Patent [19]
Brede et al.

[11] Patent Number: 5,495,748
[45] Date of Patent: Mar. 5, 1996

[54] GAS LEAKAGE MONITORING OF A GAS OR LIQUID CONTAINER

[75] Inventors: Uwe Brede, Furth; Josef Kraft, Berg, both of Germany

[73] Assignee: Dynamit Nobel Aktiengesellschaft, Troisdorf, Germany

[21] Appl. No.: 207,026

[22] Filed: Mar. 7, 1994

[30] Foreign Application Priority Data

Mar. 9, 1993 [DE] Germany ............... 43 07 378.6

[51] Int. Cl.⁶ .................................. G01M 3/04
[52] U.S. Cl. .................................. 73/40; 73/44.2
[58] Field of Search ................ 73/40, 49.3, 49.2

[56] References Cited

U.S. PATENT DOCUMENTS

| | | | |
|---|---|---|---|
| 1,974,026 | 9/1934 | Hicks | 73/49.3 |
| 2,450,625 | 10/1948 | Beecher | 73/743 |
| 2,819,609 | 1/1958 | Liebhafsky | 73/49.2 X |
| 3,884,500 | 5/1974 | Wagner . | |
| 3,938,519 | 2/1976 | McPhee | 73/49.3 X |
| 3,939,383 | 2/1976 | Alm | 340/605 |
| 4,168,621 | 9/1979 | Kreitenberg | 73/49.8 |
| 5,052,586 | 10/1991 | Philipp et al. . | |

FOREIGN PATENT DOCUMENTS

| | | | |
|---|---|---|---|
| 209624 | 11/1956 | Australia | 73/49.3 |
| 746067 | 8/1970 | Belgium | 73/49.2 |
| 0161702 | 11/1985 | European Pat. Off. . | |
| 0311475 | 4/1989 | European Pat. Off. . | |
| 0441632 | 8/1991 | European Pat. Off. | 73/49.2 |
| 2254021 | 7/1975 | France | 73/49.2 |
| 2636428 | 3/1990 | France . | |
| 286736 | 11/1988 | Japan | 73/49.3 |
| 186232 | 7/1990 | Japan | 73/49.3 |
| 172228 | 6/1992 | Japan | 73/49.3 |
| 638792 | 12/1978 | U.S.S.R. | 73/49.3 |
| 1427193 | 9/1988 | U.S.S.R. | 73/49.2 |
| 2191635 | 12/1987 | United Kingdom . | |
| 2222687 | 3/1990 | United Kingdom | 73/49.3 |

*Primary Examiner*—Hezron E. Williams
*Assistant Examiner*—Daniel S. Larkin
*Attorney, Agent, or Firm*—Antonelli, Terry, Stout & Kraus

[57] ABSTRACT

The invention relates to a method and an apparatus for monitoring of gas leakage from a gas or liquefied gas container. For simple and reliable monitoring of gas leakage, parts of the container (1) where there is a risk of leakage are connected to an at least partially evacuated measuring chamber (2) and a change in the pressure in the measuring chamber (2) is employed as a measure of the gas-tightness of the container (1).

10 Claims, 3 Drawing Sheets

ACTUATING MEMBER

GAS LEAKAGE MONITORING OF A GAS OR LIQUID CONTAINER

FIELD OF THE INVENTION

The invention relates to a method of monitoring gas leakage from a gas or liquefied gas container and to an apparatus for carrying out this method.

Gas or liquefied gas containers are used in many areas of private and commercial life.

BACKGROUND OF THE INVENTION

The hitherto unpublished German patent: application P 41 35 547 describes a gas generator for an inflatable impact cushion (airbag) for protecting an occupant of a motor vehicle from injury, in which the gas-generating material for producing gas under pressure with which the impact cushion is inflated is liquefied gas. Gas or liquefied gas generators have in principle the disadvantage that if the gas container is unsound or leaky, particularly where it is welded, gas can escape, with the result that the amount of gas or liquefied gas in the container is reduced. The gas generators may then not be operative.

It is well known to use, for example, manometers to check the pressure in a gas container. However, in the case of a container for liquefied gas this is not possible, since if a leak is present, the pressure in the gas phase, i.e. above the liquefied gas, remains almost constant.

SUMMARY OF THE INVENTION

It is therefore the object of the invention to provide a method and an apparatus by which a simple and more reliable monitoring of a gas or liquefied gas container for gas leakage is possible.

According to the invention the method of leak monitoring is characterized in that parts of the container where there is a risk of leakage are connected to an at least partially evacuated measuring chamber and a change in the pressure in the measuring chamber is employed as a measure of the gas-tightness of the container.

Accordingly the measuring chamber acts as a so-called gas trap, i.e. so that even slight leaks markedly increase the pressure in the measuring chamber. If the measuring chamber itself exhibits leakage to the atmosphere, so that an increase in pressure in the measuring chamber does not arise from leakage from the container, the user of the gas or liquefied gas container at least knows that caution is called for.

Advantageously the gas leakage monitoring is used for checking gas or liquefied gas containers of gas generators for inflatable impact cushions (airbags). These gas generators must be guaranteed to be operable even after periods of several years.

Advantageously the gas leakage monitoring is integrated in the monitoring system of the firing circuit of the gas generator. This can for example be done by providing for a warning signal to be given in the event of an increase in pressure in the measuring chamber.

An apparatus for carrying out the method, wherein the container has a sealable filling opening, is characterized according to the invention in that the measuring chamber comprises a narrow spiral tube (spiral barometer, i.e. a Bourdon tube) one end of which is connected to the filling opening directly or by way of a sleeve and the other end is closed and is connected to actuating members in such a way that in the event of an increase in gas pressure in the measuring chamber the actuating members are automatically actuated.

Narrow or flattened spiral tubes or Bourdon tubes have the advantage that their outer circumference depends on the pressure difference between the atmospheric pressure and the pressure in the tube.

If the spiral tube is not connected to the filling opening directly, but through a sleeve, the sleeve advantageously surrounds the filling opening on all sides in the form of a cup and is sealingly secured to the container so that the interior of the sleeve communicates with the interior of the spiral tube.

An alternative apparatus for carrying out the method, in which the container again has a sealable filling opening, is characterized in that the measuring chamber is the space within a sleeve surrounding the filling opening and this space has a wall that is movable relative to the atmosphere, the position of the wall depending on the pressure difference between the pressure in the interior of the sleeve and the pressure of the atmosphere.

In this apparatus an increase in pressure in the measuring chamber directly brings about a displacement of the wall, which displacement is employed as a measure of the gas-tightness of the container.

Advantageously, outwardly projecting actuating elements are arranged on the wall.

The movable wall is advantageously a diaphragm or a piston.

So that even slight leaks cause a significant displacement of the wall, the movable wall is advantageously spring loaded counter to the direction of the force exerted by the atmospheric pressure so that, even in the case of a slight increase in the pressure, the wall moves or bulges counter to the direction in which the force of the atmospheric pressure acts.

The actuating members are advantageoussly positioning devices, switches, indicating devices or measuring devices.

BRIEF DESCRIPTION OF THE DRAWINGS

The invention will now be described in more detail with reference to the accompanying drawings, in which.

DETAILED DESCRIPTION OF THE INVENTION

Figure 1:
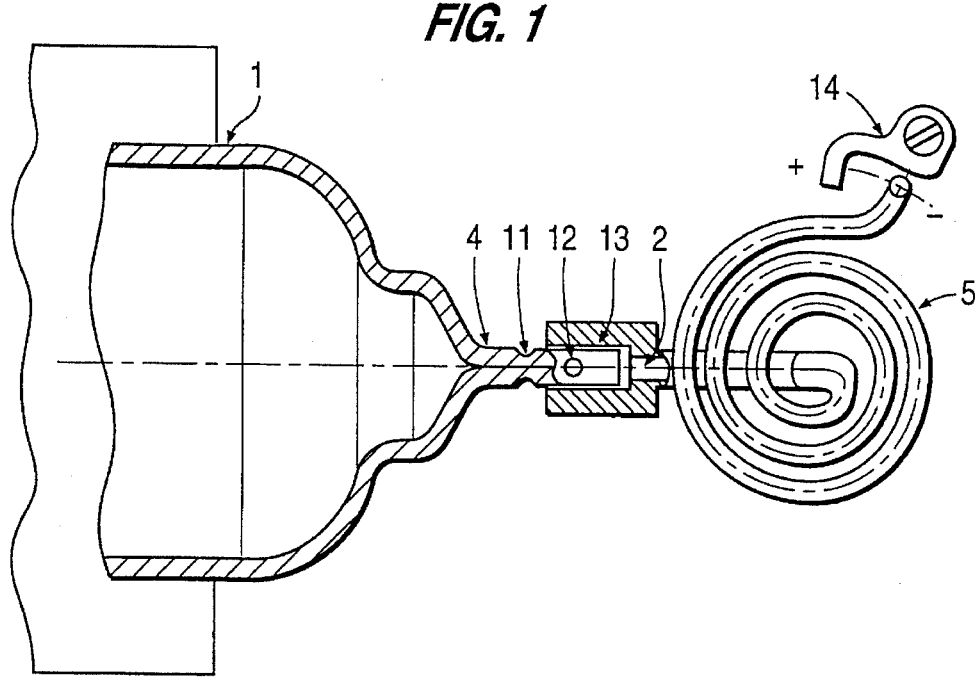
FIG. 1 is a partial sectional view showing a gas leak monitor comprising a narrow spiral tube which is connected directly to the sealed filling opening of a container.

FIG. 1 shows a container 1 for liquefied gas or compressed gas. The container 1 is made of metal in one piece and has no weld seam. At one end of the container 1 the neck of the container narrows to a filling opening 4. After the container 1 has been filled, the filling opening 4 is crimped together (see the notch 11) so that the filling opening can be sealed without difficulty by a spot weld 12. In FIG. 1 the spot weld is shown in section.

A narrow spiral tube 5 made, for example, of stainless steel, is secured to the filling opening in such a way that in the event of a possible leak at the spot weld 12 the gas emerging passes into the spiral tube 5. For this purpose the spiral tube can be widened out at its end facing the filling opening 4, pushed over the sealed portion of the filling opening and then soldered. The soldered joint is indicated by the reference numeral 13. The other end of the tube 5 is sealed. Before sealing, however, a vacuum, or at least a partial vacuum, is produced in the tube 5. The end of the tube 5 remote from the filling opening 4 is somewhat bent out and, together with a corresponding counter element, forms a switch 14.

After the production of the vacuum or partial vacuum in the tube 5 (which provides a measuring chamber 2) the switch 14 is adjusted so that normal variations in atmospheric pressure do not cause the switch to close. However, the switch 14 is closed on loss of the vacuum or partial vacuum in the measuring chamber 2. With regard to this action it must be appreciated that a narrow spiral tube occupies a smaller area in the evacuated state than when it contains air.

Thus if the vacuum in the tube 5 changes with time, the size of the spiral coil of the tube 5 correspondingly increases until, once a certain pressure is reached, the switch 14 is closed.

Loss of vacuum in the tube 5 can have two causes. One cause is a leak at the spot weld 12 and the other cause is a leak in the tube 5 relative to the atmosphere. In both cases the vacuum acts as a kind of gas trap, i.e. it also indicates any lack of gas-tightness relative to the atmosphere as an error and is therefore self-controlling. The precision depends inter alia on the volume of the measuring chamber 2, i.e. on the volume of the space inside the tube 5. The smaller the volume, the sooner is the vacuum lost if there is a leak, causing the switch 14 to close.

The gas leak detector described is particularly suitable for gas or liquefied gas containers of gas generators for inflatable impact cushions, so-called airbags.

Figure 3:
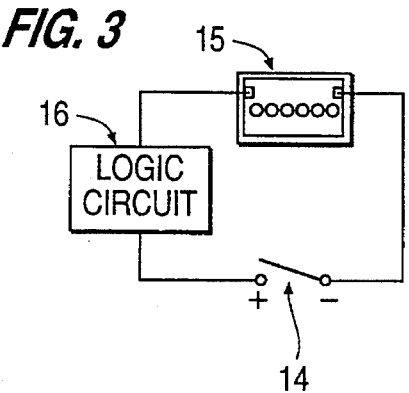
FIG. 3 is a schematic diagram of a monitoring device of a gas generator with an integrated gas leak monitor in accordance with the invention.

FIG. 3 shows an electrical circuit diagram for a monitoring device with the gas leak monitor, heretofore described. In this figure 15 indicates a battery, and 16 a logic circuit. If the switch 14 is open, i.e. if there is no leak, the logic circuit 16 outputs, for example, a ready signal to an ignition circuit. If the switch 14 is closed, i.e. when a leak is present, the logic circuit 16 outputs a warning signal.

Figure 2:
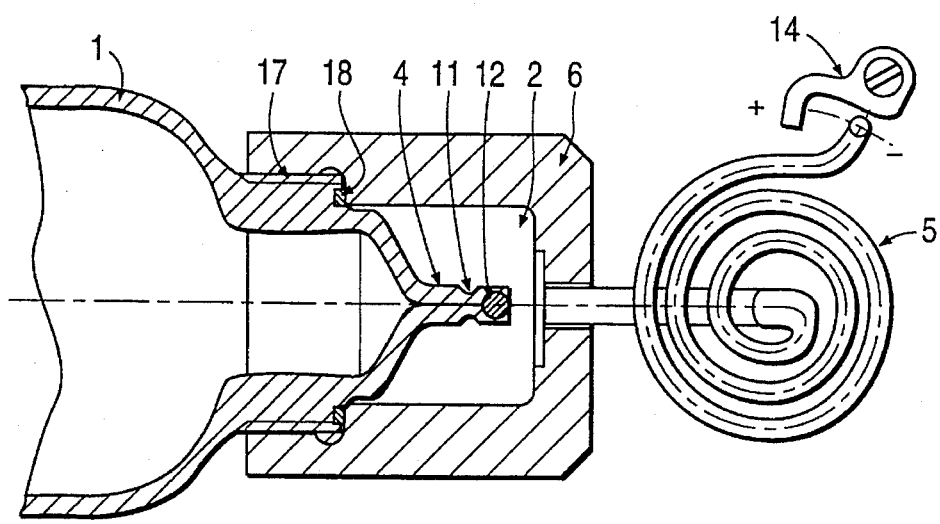
FIG. 2 is a partial sectional view showing a gas leak monitor as shown in FIG. 1, in which the spiral tube is connected to the sealed filling opening by way of a sleeve.

FIG. 2 shows an arrangement similar to that of FIG. 1 except that the spiral tube 5 is connected to the filling opening 4 by way of a sleeve 6. The sleeve 6 is in the form of a cup surrounding the filling opening 4 on all sides, and is screwed sealingly on to the container 1. For this purpose the neck of the container 1 is provided with a screw thread 17. The sealing is effected by an annular seal 18 which is pressed on to the neck of the container 1 by the sleeve 6. A bore is made in the sleeve 6 at the opposite end to the screw thread 17, into which one end of the tube 5 is soldered or brazed. The manner of operation is the same in this embodiment as in FIG. 1, the measuring chamber here being somewhat larger.

FIGS. 4 to 7 show embodiments in which a sleeve 7, as also shown in FIG. 2, surrounds the filling opening 4 on all sides in the form of a cup and is secured to the container 1 by means of a screw thread 17 and an annular seal 18. There is a bore 19 in the sleeve at the end opposite the filling opening 4.

Figure 4:
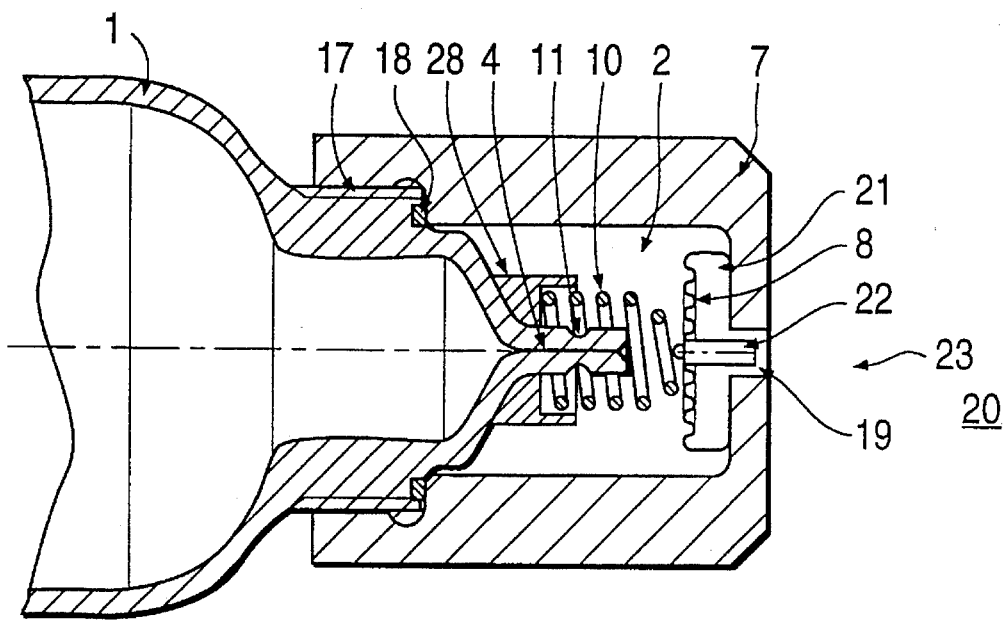
FIG. 4 is a partial sectional view showing a gas leak monitor with a spring loaded diaphragm.

In the embodiment shown in FIG. 4 the atmosphere 20 communicates via the bore 19 with a cavity 21 which is in the interior of the sleeve 7, and whose side facing towards the filling opening 4 comprises a diaphragm 8. The diaphragm 8 forms a movable wall of the measuring space 2, i.e. of the interior of the sleeve 7. The diaphragm 8 is connected to the inner wall of the sleeve 7, e.g. by a soldered joint, so that the measuring chamber has no contact with the atmosphere 20. A part or pin 22 that projects into the bore 19 is fixed to the diaphragm 8. If a sub-atmospheric pressure prevails in the measuring chamber 2, the pin 22 does not project from the bore 19. Only when there is loss of vacuum in the measuring chamber 2 and the diaphragm 8 moves outwards counter to the direction 23 of the force exerted by the atmospheric pressure does the pin 22 project from the bore 19. This has the great advantage that a dealer can check the container 1 for gas leakage purely mechanically or optically, simply by feeling or observing whether or not the pin 22 is projecting from the bore 19. Even when there is only a slight leak, i.e. in the case of a slight loss of the vacuum in the measuring chamber 2, the pin 22 projects from the bore 19 and the diaphragm 8 is urged by a spring 10 counter, to the direction 23 of the atmospheric force. The spring 10 bears on one side against the neck of the container 1 and on the other side against the diaphragm 8. For this purpose a cup-shaped support 28 is positioned on the neck of the container 1 into which the spring 10 projects and in which it is supported.

Figure 5:
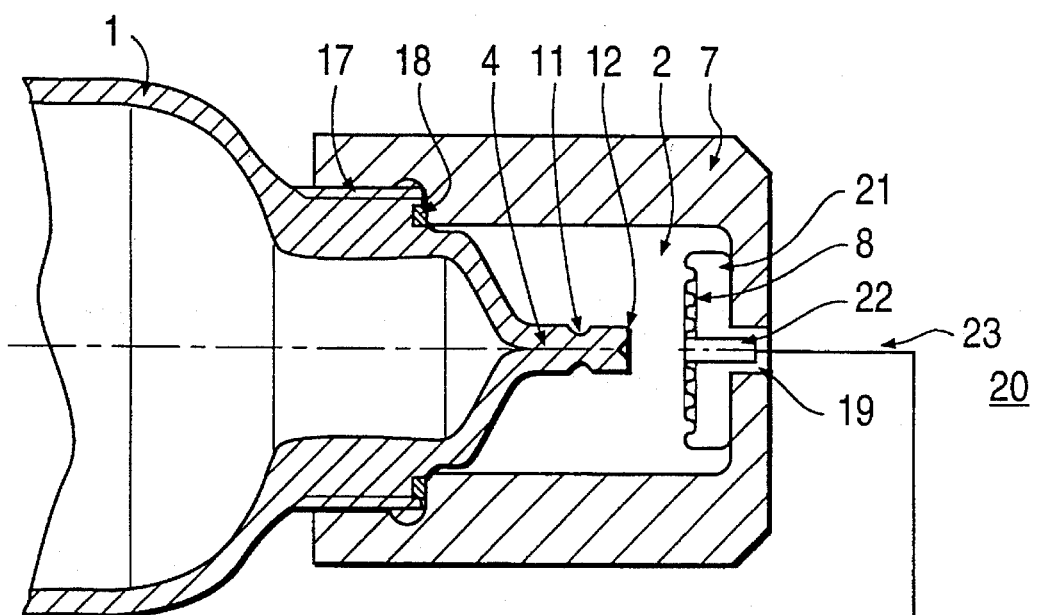
FIG. 5 is a partial sectional view showing a gas leak monitor with a diaphragm that is not spring loaded.

The embodiment shown in FIG. 5 is the same as that of FIG. 4 except that in it the diaphragm 8 is not acted on by a spring. Other actuating members such as positioning devices, switches, indicating devices or measuring devices can of course be connected to the pin 22.

Figure 6:
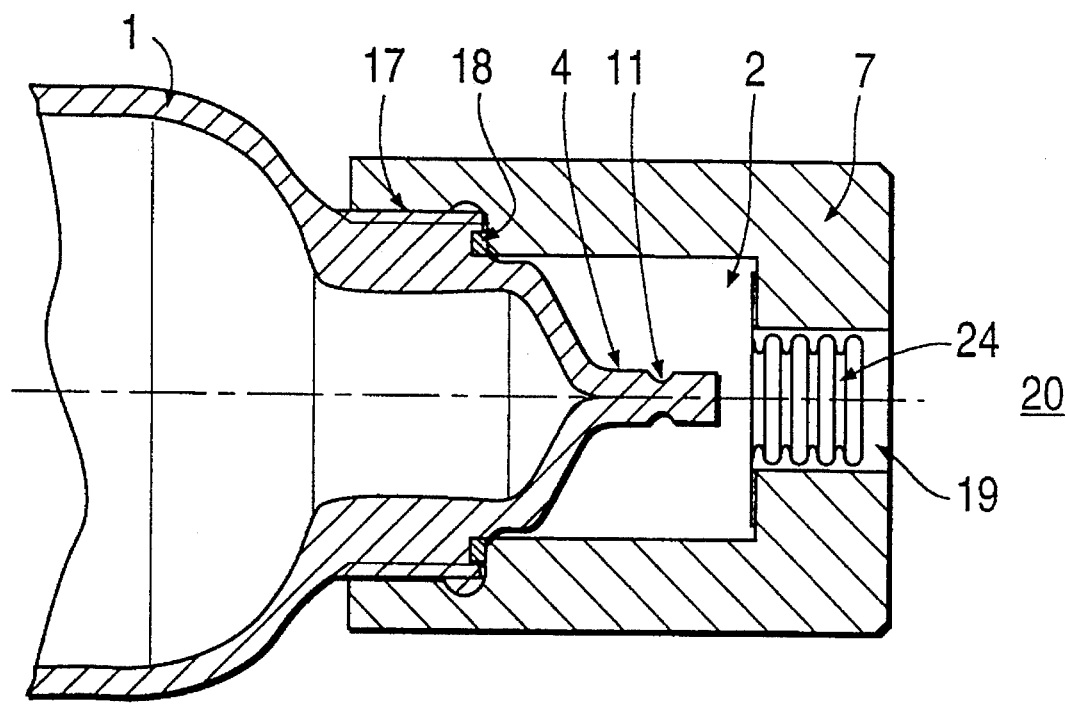
FIG. 6 is a partial sectional view showing a gas leak monitor with a bellows.

FIG. 6 shows an alternative embodiment with a bellows 24 which projects into the bore 19. The bellows 24 seals the measuring chamber 2 against the atmosphere 20 and replaces the diaphragm with the pin of FIGS. 4 and 5. However, the manner of operation is identical.

Figure 7:
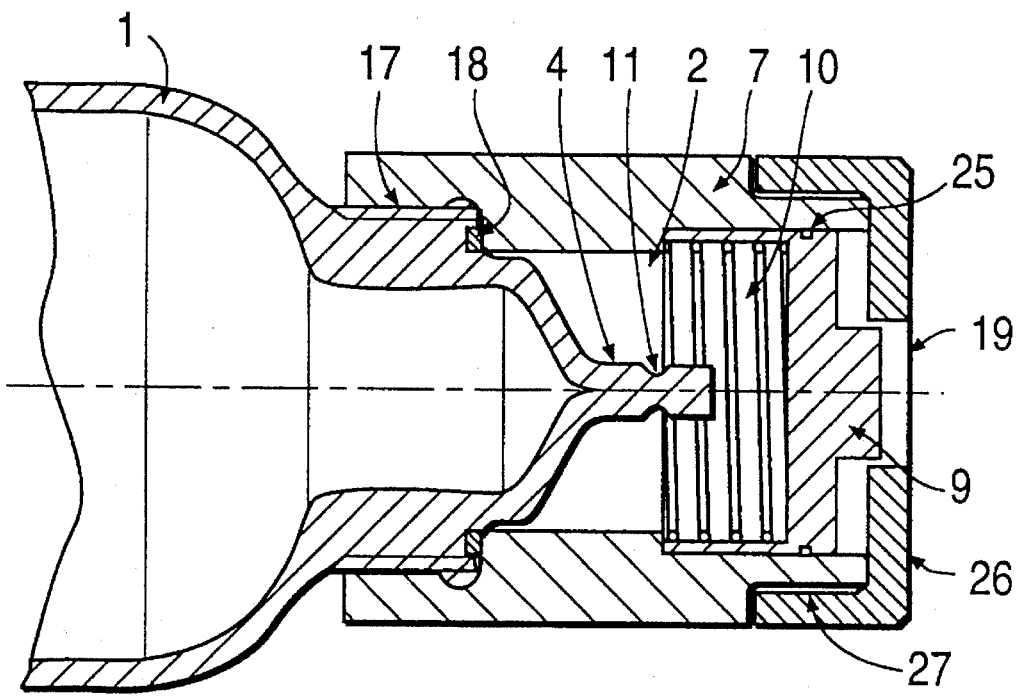
FIG. 7 is a partial sectional view of a gas leak monitor with a spring loaded piston.

In FIG. 7 an embodiment is shown in which a piston 9 forms the movable wall of the measuring chamber 2. For this purpose the cylindrical interior of the sleeve 7 has at the opposite end to the filling opening 4 a radially widened portion in which the piston 9 is guided. For sealing purposes, an annular seal 25 is inserted between the piston 9 and the inner wall of the sleeve 7. The opposite end of the sleeve 7 to the filling opening 4 is formed by a cup-shaped flange 26 which is secured to the sleeve 7 by a screw thread 27. A bore 19 into which a stud-shaped extension of the piston projects is formed centrally in the flange 26. In addition, the piston 9 is spring loaded by a spring 10 in a manner similar to that shown in FIG. 4. The spring 10 bears at one end against the piston 9 and at the other end against the sleeve 7.

What is claimed is:

1. An apparatus for monitoring gas leakage from a gas or liquefied gas container of a generator for inflating an inflatable airbag of a vehicle, wherein the container has a sealed filling opening, which comprises a measuring chamber connected to a zone surrounding the sealed filling opening, said measuring chamber comprising a narrow spiral tube, one end of which is connected to the zone surrounding the filling opening and the other end of which is closed and which is associated with actuating members in such a way that, in the event of an increase in pressure in the measuring chamber, the spiral tube moves and the actuating members are automatically actuated.

2. An apparatus according to claim 1, wherein said measuring chamber further comprises a sleeve surrounding the filling opening on all sides in the form of a cup and being sealingly secured to the container, said tube being connected to the sleeve so that the interior of the sleeve communicates with the interior of the tube.

3. An apparatus for monitoring gas leakage from a gas or liquefied gas container of a gas generator for inflating an inflatable airbag of a vehicle, said container having a sealed filling opening, which comprises a measuring chamber connected to the container, said measuring chamber comprising a sleeve surrounding the filling opening on all sides and defining a space and a wall that is movable and open to the atmosphere, the position of the wall being dependent on the pressure difference between the pressure in the space within the sleeve and the pressure of the atmosphere.

4. An apparatus according to claim 3, wherein outwardly projecting actuating members are arranged on the movable wall for indicating movement of the wall.

5. An apparatus according to claim 3, wherein the movable wall comprises a diaphragm.

6. An apparatus according to claim 3, wherein the movable wall comprises a piston.

7. An apparatus according to claim 3, wherein the movable wall is acted upon by the force of a spring counter to the direction in which force of the atmospheric pressure acts, so that even in the event of a slight increase in the pressure in the space, the wall is moved or bulges counter to the direction of action of the force of the atmospheric pressure.

8. An apparatus according to claim 4, wherein the actuating members comprise control devices, switches, indicating devices or measuring devices for indicating a gas leakage from said container.

9. A method for monitoring gas leakage from a gas or liquified gas container of a gas generator of an inflatable airbag of a vehicle over a prolonged period of time which comprises providing an at least partially evacuated measuring chamber operatively associated with a monitoring system for a firing circuit of the gas generator, said measuring chamber having a movable portion which moves upon a change of pressure within said chamber; connecting parts of the container where there is a risk of leakage to the measuring chamber; and utilizing a change in pressure in the measuring chamber, as evidenced by movement of said movable portion, as a measure of gas leakage from the container.

10. A method according to claim 9, which further comprises indicating the gas leakage from the container by providing a warning signal in the monitoring system of the firing circuit of the gas generator.

* * * * *